US006549966B1

(12) United States Patent
Dickens et al.

(10) Patent No.: US 6,549,966 B1
(45) Date of Patent: Apr. 15, 2003

(54) DATA ROUTING DEVICE AND SYSTEM

(75) Inventors: Nigel Anthony Dickens, Cambridge (GB); Adrian Christopher Dickens, Cambridge (GB)

(73) Assignee: Adder Technology Limited, Cambridge (GB)

( * ) Notice: Subject to any disclaimer, the term of this patent is extended or adjusted under 35 U.S.C. 154(b) by 0 days.

(21) Appl. No.: 09/493,947

(22) Filed: Jan. 28, 2000

(30) Foreign Application Priority Data

Feb. 9, 1999 (GB) .............................. 9902792

(51) Int. Cl.$^7$ .............................................. G06F 13/00
(52) U.S. Cl. ..................... 710/300; 710/314; 710/316; 710/100; 710/104; 710/105; 710/53; 370/406
(58) Field of Search ................ 710/300, 104, 710/53, 314

(56) References Cited

U.S. PATENT DOCUMENTS

| | | | | | |
|---|---|---|---|---|---|
| 3,832,695 | A | * | 8/1974 | Nickel et al. ................ | 710/316 |
| 4,864,291 | A | * | 9/1989 | Korpi ....................... | 340/825.5 |
| 5,619,650 | A | * | 4/1997 | Bach et al. ................. | 370/466 |
| 5,925,120 | A | * | 7/1999 | Arp et al. ................... | 710/314 |
| 6,115,771 | A | * | 9/2000 | Born ......................... | 462/61 |
| 6,256,687 | B1 | * | 7/2001 | Ellis et al. ................. | 710/53 |
| 6,324,605 | B1 | * | 11/2001 | Rafferty et al. ............ | 710/100 |
| 6,334,160 | B1 | * | 12/2001 | Emmert et al. ............. | 710/105 |
| 6,353,866 | B1 | * | 3/2002 | Fensore et al. ............. | 710/104 |

* cited by examiner

Primary Examiner—Glenn A. Auve
Assistant Examiner—Justin King
(74) Attorney, Agent, or Firm—Beyer Weaver & Thomas, LLP

(57) ABSTRACT

A serial data routing device for use in routing serial data between a computer and a peripheral device. The data routing device includes a computer data converter which communicates data under the USB protocol with a computer and which converts data received from the computer into converted computer data. A peripheral data converter is also included which communicates data under the USB protocol with the peripheral device and which converts data received from the peripheral device into converted peripheral data. A data router is provided in communication with the computer data converter and the peripheral data converter and transfers converted computer data and converted peripheral data between them. It includes a data routing controller which controls the routing of the converted computer data and the converted peripheral data between the computer data converter and the peripheral data converter such that the computer and peripheral device operate as though directly connected by a USB bus.

16 Claims, 2 Drawing Sheets

DATA ROUTING DEVICE AND SYSTEM

Figure 1:
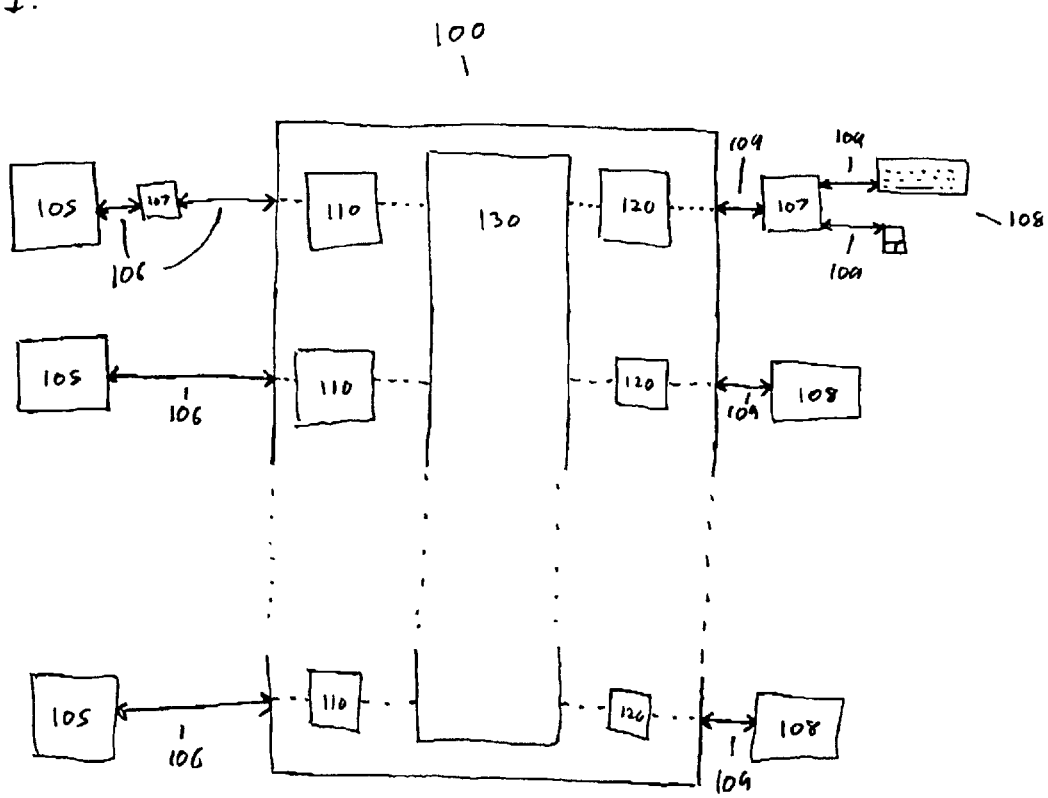

The present invention relates to a data routing device for routing data from computers to peripheral devices. In particular, but not exclusively, the invention relates to a data routing device allowing a number of computers to share a number of peripherals by controlling the routing of data originating and terminating under a Universal Serial Bus (USB) protocol and a system incorporating the device, USB host computers and shared USB peripherals.

The Universal Serial Bus (USB) is a powerful and convenient way of connecting local peripherals to a host computer. The term "Universal Serial Bus" relates to the hardware and software that allows a computer to be connected to and operate with a peripheral device. The host computer includes a controller which interfaces the computer with the physical bus, along which signals travel, to which peripheral devices can be attached. The transmission of data is controlled by a USB protocol which comprises a set of rules, procedures and conventions relating to the format and timing of data transmission between devices, The peripherals are typically printers, scanners, keyboards, mice, speakers, microphones, joysticks, cameras, and modems although other peripheral devices are also supported. Multiple peripherals may be connected to a single shared Universal Serial Bus and data transfer between the peripherals and the host computer is achieved by allowing each peripheral to use time on the USB bus in turn. The flow of data across the Universal Serial Bus is controlled by the USB host computer.

It is often desirable for cost, convenience and space saving reasons to share peripherals between groups of computers. Currently this is often achieved by using LAN connections such as Ethernet or by connecting multiple peripheral ports to data switching devices. The wiring of such data switching devices can become complicated and costly when multiple peripherals are to be shared because several different types of wires may need to be connected to each computer.

The Universal Serial Bus overcomes these wiring difficulties by enabling a group of diverse peripherals to be connected using a single common interface. Such wiring simplification is particularly beneficial in data switching applications that would otherwise require multiple sets of multiple cables. The invention provides for the sharing of USB peripherals between multiple USB host computers and provides a data routing system design that takes advantage of the simpler USB wiring whilst also allowing connection to multiple USB host computers.

In practical peripheral sharing applications, decisions need to be made about how to allocate connections to the peripherals between computers. Such allocation decisions are usually specific to the application and depend upon factors such as control panel switch settings, stored parameter values, time delays, data flow and sequences of data that trigger special events. The routing of data on a Universal Serial Bus is controlled by the host computer in a manner that is too inflexible to allow multiple host computers to share USB peripherals in a way that takes account of these actors. Unresolved conflicts would therefore occur if more than one USB host was connected to the same USB peripheral bus without providing a system of arbitration.

According to a first aspect of the invention there is provided, a serial data routing device for use in routing serial data between a computer and a peripheral device, including:

- a computer data converter which communicates data under the USB protocol with a computer and which converts data received from the computer into converted computer data;
- a peripheral data converter which communicates data under the USB protocol with the peripheral device and which converts data received from the peripheral device into converted peripheral data; and
- a data router in communication with the computer data converter and the peripheral data converter which transfers converted computer data and converted peripheral data between them and which includes a data routing controller which controls the routing of the converted computer data and the converted peripheral data between the computer data converter and the peripheral data converter such that the computer and peripheral device operate as though directly connected by a USB bus.

The invention obviates conflicts by providing a data routing device that routes data streams between a host computer and a peripheral in a manner that does not rely on the USB protocol. The device can be for use in routing data between a plurality of host computers and a USB peripheral or a plurality of USB peripherals. Because the data routing is controllable the invention is able to allocate USB peripherals to particular USB host computers by switching the data flow between them on and off. In this way the peripheral can be shared between multiple USB host computers on a basis that is appropriate for the application.

Signals under the USB protocol are received by the device from the host computer and are converted into a non-USB protocol form. The converted data is then transmitted along an internal bus of the device under the control of the data routing controller and may be processed or passed on to a particular peripheral device. The converted data is then re-converted back into USB protocol signals before being transmitted to the peripheral device. USB protocol signals originating from a peripheral device are routed to the appropriate computer in the reverse manner. Hence the host computer and peripheral device act as though connected by a USB, but the control of the data transmitted between them is achieved in a USB protocol independent manner. This allows a plurality of host computers to access a shared set of peripheral devices without the conflicts.

Practical applications for the invention include printer and modem sharing apparatus and equipment to allow multiple computers to be controlled using a single keyboard, a single mouse and a single pair of speakers. When utilised in printer sharing apparatus the invention can enable data from two or more USB host computers to contend for a USB connected printer on a timeout basis. Data activity from each of the computers can be monitored and routed through to the printer on a first come first served basis. Switchover between the data sources can occur when a break in data transmission greater than a defined timeout period has been detected. The invention is particularly beneficial when applied to systems involved in sharing USB keyboards, mice, speakers and microphones between host computers. These peripheral switching systems can be used to allow a bank of computers to be controlled by a system administrator using a single keyboard, monitor, mouse and speaker set.

Traditional solutions would require multiple conductor links between the host computers and the sharing device. USB links between the connected devices allow the cabling to be simplified by reducing the number of conductors required. The use of USB ports may also have the added advantage of leaving the traditional keyboard, mouse and audio peripheral ports free for other purposes.

Preferably, the computer data converter includes processing means to convert converted peripheral data into USB protocol signals which are communicated to the computer. The computer data converter is configured to accept converted peripheral data and process it to generate equivalent USB protocol signals which are output directly to the USB host computer operating under the USB protocol.

Preferably, the peripheral data converter includes processing means to convert converted computer data into USB protocol signals which are communicated to the peripheral device. The peripheral data converter is configured to accept converted computer data signals and process them to generate equivalent USB protocol signals which are output to the USB peripheral device.

Preferably, the data router includes an emulator which generates data causing USB protocol signals to be output from the computer data converter to the computer and from the peripheral data converter to the peripheral device. An emulator can be included in the data router which generates emulation data which can be fed to the computer data converter and peripheral data converter and output as USB protocol signals. The USB protocol signals output from the computer data converter emulate the presence of USB peripheral devices connected to the USB host computer and so the host computer operates as though connected directly to USB peripheral devices on a USB. The USB protocol signals output from the peripheral data converter emulate the presence of a USB host computer connected to the USB peripheral devices and so the USB peripheral devices operate as though connected directly to a USB host computer on a USB.

Preferably, the device has a USB connection transferring signals between the computer and the computer data converter and the USB protocol signals are output from the computer data converter to the computer via the USB connection and mimic the connection of a peripheral operating under the USB protocol directly to the computer via the USB connection. The emulation USB protocol signals output from the computer data converter emulate the presence of peripheral devices connected to the host computer and so the host computer operates as though connected directly to USB peripheral devices on a USB.

Preferably, the device has a USB connection transferring signals between the peripheral device and the peripheral data converter and the USB protocol signals are output from the peripheral data converter to the peripheral device via the USB connection and mimic the connection of a computer operating under the USB protocol directly to the peripheral via the USB connection. The emulation USB protocol signals output from the peripheral data converter emulate the presence of a USB host computer connected to the USB peripherals and so the USB peripherals operate as though connected directly to the USB host computer on a USB. The USB connection may be a USB peripheral bus. This allows a single peripheral data converter to a service a plurality of USB peripherals connected to the USB bus. The USB connection may be a USB hub.

Preferably, the data routing controller includes a microprocessor having a memory device. The microprocessor can process and/or control the data being routed through the data router and can utilise the memory device to store data directly or the results of processing data.

Preferably, routing of the converted computer data and converted peripheral data is effected by transferring data between locations within the memory device. In this way the routing of data is achieved by software. The software may control operation of the microprocessor to store data to be routed in the memory device, and then transferring it to a different location in the memory device, to effect the 'routing' of the data before it is passed back to the data router for transfer to the appropriate device. The data stored may be data which is the result of processing operations carried out by the microprocessor on the converted computer or peripheral data.

Preferably, the data router includes a non-USB bus in communication with the computer data converter, peripheral data converter and the microprocessor and the microprocessor processes converted computer data and converted peripheral data received via the non-USB bus and controls the routing of converted computer data and converted peripheral data in response to the processing of the converted computer or peripheral data and/or data stored in the memory device. The converted computer data and peripheral data may be transferred through the data router by a non-USB bus. The routing of the data on the non-USB bus is controlled by the microprocessor, which controls the routing in response to its processing of the converted computer or peripheral data or on the basis of data stored in the memory device.

Preferably, the device includes a control panel having option switches in communication with the data routing controller which set the values of parameters used by the data routing controller to control the routing of the converted computer and peripheral data. Option switches, such as DIP switches may be provided so that a user of the device can set parameter values used by the data routing controller to control the routed data, e.g. the length of a printer time out.

Preferably, the control panel includes a visual display which gives an indication of the status of the system. Visual display means such as indicator lights may be provided in the control panel to give the user an indication of the status of the device, e.g. whether one of the host computers is trying to access one of the peripherals.

According to a second aspect of the invention there is provided a serial data routing system including a plurality of computers each having a USB connection, a peripheral device having a USB connection and a serial data routing device comprising:

a plurality of computer data converters which communicate data under the USB protocol via a respective USB connection with a respective computer and which convert data received from the computers into converted computer data;

a peripheral data converter which communicates data under the USB protocol with the peripheral device via its USB connection and which converts data received from the peripheral device via its USB connection into converted peripheral data; and a data router in communication with the computer data converters and the peripheral data converter which transfers converted computer data and converted peripheral data between them and which includes a data routing controller which controls the routing of the converted computer data and the converted peripheral data between the computer data converter and the peripheral data converter such that the computers and peripheral device operate as though directly connected by a USB bus.

Preferably, the system includes a plurality of peripheral devices connected to the USB connection. The USB connection can be a USB peripheral bus. In this way a plurality of USB peripherals may be serviced by a single peripheral data converter. The USB connection can be a USB hub.

The serial data routing device can have a plurality of peripheral data converters, each in communication with the data router. Each peripheral data converter can be connected to a one or a plurality of the plurality of peripheral devices by a USB connection. Each peripheral device can have a USB connection by which it is connected to a respective one of the plurality of peripheral data converters.

Figure 2:
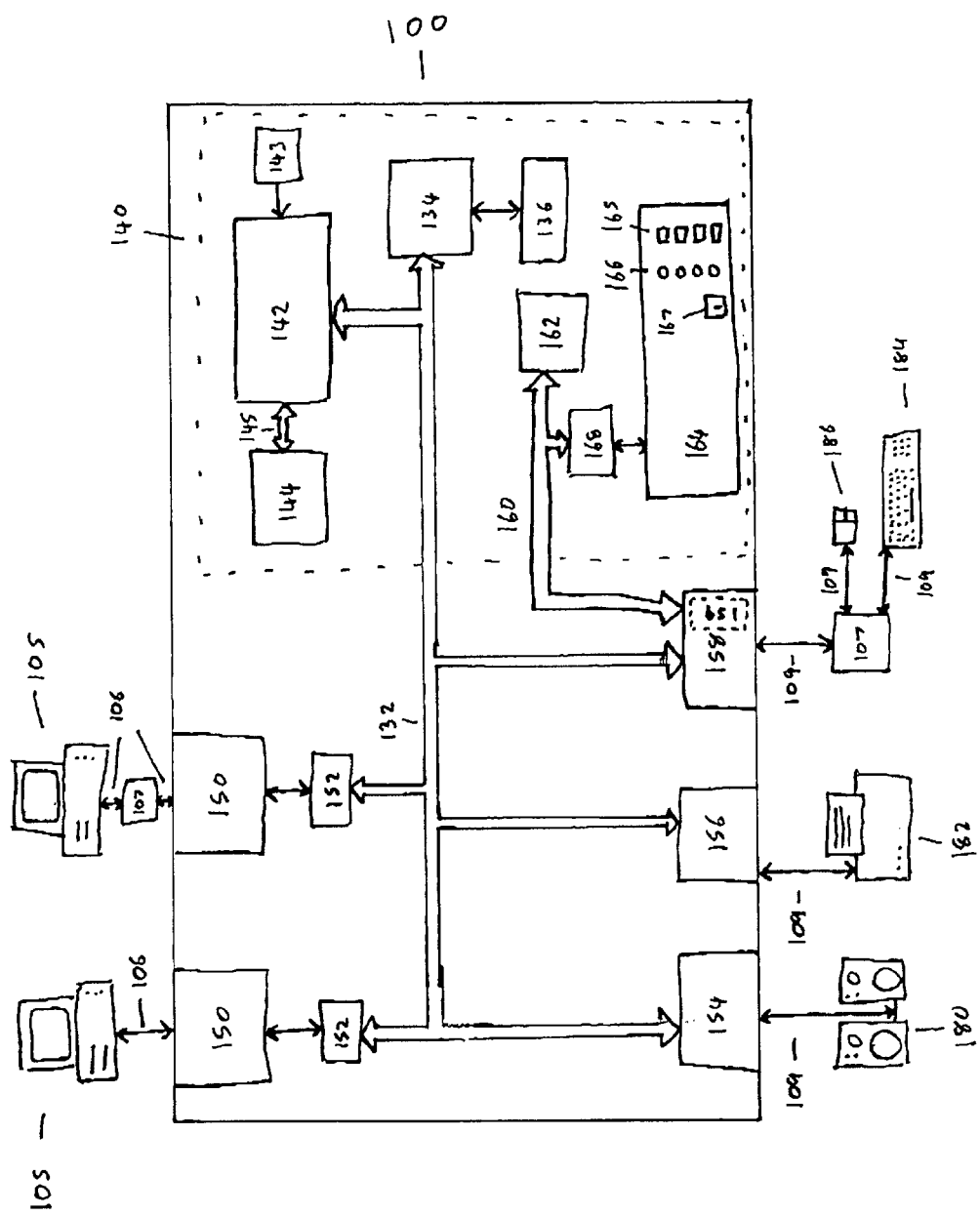

The present invention will now be described, by way of example only, with reference to the accompanying drawings, in which:

FIG. 1 shows a schematic illustration of a data routing device and system according to aspects of the invention; and FIG. 2 shows a schematic functional block diagram of a data routing device and system according to aspects of the invention.

The same parts in the different Figures share common reference numerals.

With reference to FIG. 1 there is shown a schematic illustration of the data routing device, designated generally by reference numeral 100, according to a first aspect of the invention. The device includes computer data converters 110 and peripheral data converters 120. A data router 130 is also provided and is in communication with each computer data and peripheral data converter. A computer data converter is provided for each USB host computer to be connected to the device. A plurality of peripheral data converters 120 are provided and either a single USB peripheral device or a plurality of USB peripheral devices are connected to a peripheral data converter of the device.

A data routing system according to a second aspect of the invention is also illustrated in FIG. 1. The data routing system includes the data routing device 100 and a plurality of USB host computers 105. Each USB host computer 105 is linked to a respective computer data converter 110 by a Universal Serial Bus 106 connection. These buses 106 consist of multi-conductor USB cables and may also include USB hubs 107. Data is transferred between the USB host computers and the data routing device using the USB protocol USB protocol signals from the computers are transmitted to the computer data converters 110 in the device.

The computer data converters 110 include emulation function means that emulate the presence of a keyboard, mouse, printer and set of speakers on each of the Universal Serial Buses 106. This causes each of the USB host computers to detect the presence of each of these peripherals and configure themselves accordingly. Once configured the computers communicate with the computer data converter circuits as if they were connected to a USB peripheral bus that is attached to a USB keyboard, mouse, printer and set of speakers. The computer data converter circuits extract peripheral data streams intended for the keyboard, mouse, speakers and printer to provide converted computer data. They also perform the reverse task of receiving converted peripheral data that have been routed and processed by the data router 130 and preparing them for transmission to the host computers 105 using the USB protocol.

The data router 130 is linked to each of the computer data converters 110 and peripheral data converters 120 and controls the flow of data between them. The data router includes a microprocessor which controls the data routing and performs data processing operations as will be described later. The microprocessor makes routing and data processing decisions based upon several information sources. The information sources, data processing and routing strategies for each of the data streams are described in detail later. The data router 130 supports bi-directional data steams so that data can flow in both directions between the USB computers and the peripheral devices.

A plurality of USB peripheral devices 108 are also included. The USB peripherals are provided with a USB connection 109 by which a peripheral device or a plurality of peripheral devices are connected to a peripheral data converter 120 of the device. A keyboard and a mouse are shown connected to a USB hub 107 connected to the device. The routed and processed data streams intended for the keyboard, mouse and other peripherals are transmitted to the peripheral data converters. The different data streams are implemented by moving data between memory locations as will be described later. USB protocol signals are bi-directionally transmitted along the connection between the USB peripheral devices and the data routing device.

The peripheral data converter circuits 120 include functions that emulate the presence of a USB host computer on each of the USB peripheral buses 109. This causes the peripherals 108 to communicate with the peripheral data converter circuits 120 as if they were connected to a USB host computer. The peripheral data converter circuits 120 convert the converted computer data streams into the format required by the Universal Serial Bus and transmit the data to the peripherals 108 via Universal Serial Buses 109 using the USB protocol. These Universal Serial Buses 109 consist of multi-conductor USB cables and may also include USB hubs 107. The peripheral data converters 120 also perform the reverse task of communicating with the peripherals via the Universal Serial Buses 109 using the USB protocol extracting the data streams directed to the USB host computer for each device and transmitting converted peripheral data on to the data router 130.

With reference to FIG. 2, there is shown a schematic functional block diagram of a data routing device and data routing system according to aspects of the present invention. The data router 130 includes a Peripheral Component Interconnect (PCI) bus 132. The PCI bus 132 has a PCI bus to memory interface circuit 134 and the PCI bus/memory interface has an associated memory device 136 containing system control software. A Texas Instruments PCMCIA controller PCI1221 is a suitable PCI bus/memory interface and an Intel (Registered trade mark) 28F640J5 flash memory is a suitable memory device. The data router includes a data routing controller 140. Aspects of the data routing controller are distributed through out the data router 130. The data routing controller includes a microprocessor 142 having a clock 143 and a memory device 144 in communication via a memory bus 145. The microprocessor is in communication with the PCI bus 132. A suitable microprocessor would include an embedded Intel Pentium (Registered trade mark) 266 MHz processor assembly including an Intel 82439TX system controller. The memory device 144 includes DRAM which is in communication with the microprocessor 142 via DRAM bus 145.

Two computer data converters 110 are provided. Each computer data converter includes a USB device controller 150 and bus interface logic circuitry 152 via which the data converters communicate with the PCI bus 132. A Lucent Technologies USS-820 is a suitable USB device controller. A computer data converter is realised by a USB device controller working together with the microprocessor. Three peripheral data converters 120 are provided. Two of these 154, 156 include PCI to USB host controllers. A peripheral data converter is realised by a PCI to USB host controller working together with the microprocessor. The PCI to USB host controllers are in communication with the PCI bus. A Lucent Technologies USS-302 is a suitable PCI to USB host controller. A pair of audio speakers 180 are connected to the first host controller 154 by a USB connection 109 and a printer 182 is connected to the second host controller 156 by a USB connection 109. The third peripheral data converter 158 includes a PCI to USB host controller 158 which also incorporates PCI to ISA/IDE bus interfacing circuitry 159. The Intel 82371AB PCI to ISA/IDE Xcelerator can provide suitable bus interfacing. The third peripheral data converter is realised by the PCI to USB host controller operating together with the microprocessor. A keyboard 184 and a mouse 186 are connected by USB connection 109 and via a USB hub 107 to the third peripheral data converter 158.

An ISA bus 160 is provided from the bus interfacing circuitry. A memory device 162 is provided which stores program instructions for the microprocessor 142. The memory device 162 is in the form of 8×256K flash BIOS. A control panel 164 is also provided with control panel circuitry and includes option switches 165, indicator lights 166 and a key switch 167. The control panel is connected to the ISA bus 160 by bus interface logic circuitry 168.

The functioning of the data routing device will now be described to FIG. 2 which illustrates the electronic hardware that is used to implement the device. The core microprocessor architecture used is similar to that used for embedded PCs. The operation of this type of microprocessor architecture can be summarised as follows.

The microprocessor assembly 142 is clocked by the clock circuit 143. It reads its program instructions from the BIOS memory 134 and the application software memory 136 via the PCI bus 132 and the ISA bus 160 with the PCMCIA controller 134 and PCI to ISA Xcelerator 158 providing the necessary bus interfacing. The application software requires the processor to access DRAM memory 144 and this is done using the DRAM bus 145.

The computer data converter circuits 110 are implemented using Lucent Technologies USS-820 USB device controllers 150 working together with the microprocessor 142. The USS-820 is a USB device controller that provides a programmable bridge between a Universal Serial Bus and a microprocessor bus, in this case PCI bus 132. The microprocessor 142 communicates with the USS-820 USB device controllers 150 via the PCI bus 132 and the bus interface logic 152. The microprocessor 142 emulates the presence of a keyboard 184, mouse 186, printer 182 and set of speakers 180 on each of the Universal Serial Buses 106 connecting each of the computers to the device by signalling to each of the USB host computers 105 via the USS-820 device controllers 150 in the manner required by the USB specification. The microprocessor 142 converts incoming computer data from the USB host computers 105 into a format that is independent of the USB protocol and stores it in DRAM 144. It also performs the reverse task on data that is flowing in the opposite direction.

The microprocessor 142 implements the data router 130 by transferring data between RAM locations according to the rules defined by the application software that is stored in flash memory 136. The microprocessor 142 accesses several sources of information in order to make data routing decisions. Information from the control panel circuit 164 is read via the PCI bus 132, PCI to ISA bus interface circuitry 158, ISA bus 160 and bus interface logic 168. This information contains the state of the key switch 167 and the options switches 165. In addition to reading the state of the control panel switches the processor controls the indicator lights 166 by writing the required state to the control panel circuit.

The clock circuit 143 provides timing information to the processor 142 and setup parameters that were stored during the power up sequence are also available from the DRAM 144. The processor stores historical information in the DRAM memory about the flow of data and uses this information to make data routing and data processing decisions. In addition, the data itself is monitored and processed with additional data being generated when required, such a form feed character at the end of a print job.

The peripheral data converter circuits 120 are implemented using Lucent Technologies USS-302 PCI to USB host controllers 154,156 and an Intel 82371AB PCI to ISA/IDE Xcelerator 158, incorporating a PCI to USB host controller, working together with the microprocessor 142. The PCI to USB host controllers provide the conversion between the PCI bus and the Universal Serial Buses 109 that are connected to the set of speakers 180 and the printer 182. The Intel 82371 AB incorporates a PCI to USB host controller and provides the conversion between the PCI bus 132 and the USB connections 109 to the keyboard 184 and mouse 186.

The Intel 82371AB PCI to ISA/IDE Xcelerator (PIIX4) 158 is a multi-function PCI device that implements a PCI to ISA bridge function 159 and a Universal Serial Bus host/hub function. The microprocessor takes data from the DRAM 144 that is in a format that is independent of the USB protocol. This data is then transmitted to the USB host controller 158 via the PCI bus 132 and then on to the keyboard 184 and mouse 186 via USB hub 107 and USB connections 109. Any data received from the keyboard 182 and mouse 186 under the USB protocol is converted into a format that is independent of the USB protocol and stored in the DRAM 144 ready for processing by the data routing circuit.

The Lucent Technologies USS-302 PCI to USB host controllers 154,156 provide two USB ports each although only one is used on each controller. The microprocessor 142 takes data from the DRAM 144 that is in a format that is independent of the USB protocol. This data is then transmitted to the USB host controllers 154,156 via the PCI bus 132 and then on to the speakers 180 and printer 182 via the Universal Serial Buses 109 and under the USB protocol. Any data received from the printer 180 and speakers 182 is converted by the peripheral data converters into a converted peripheral data format that is independent of the USB protocol and stored in the DRAM 144 ready for processing by the microprocessor 142 of the routing controller 140.

The data routing device enables a USB keyboard, mouse, printer and set of speakers to be shared between two USB host computers. The device allows the control of two computers with a single USB keyboard and mouse whilst simultaneously monitoring audio signals and providing a printing facility from both computers. Those skilled in the art will recognise that a system including two host computers, keyboard, mouse, printer, speakers and data routing device represents just one of many possible systems according to the system aspect of the invention. Obvious variations include systems with more host computers and more peripherals such as keyboards, mice, cameras, modems, printers, speakers and microphones.

The keyboard 184, mouse 186, speakers 180 and printer 182 are shared using different strategies. The keyboard and mouse are used to control either of the two computers but are configured to control the same computer at any one time. The controlled computer can be selected using a key switch 167 fitted to the control panel 164 on the data routing system or by pressing a hotkey sequence on the keyboard (ctrl, alt and tab pressed together). The microprocessor 142 routes and processes the keyboard 184 and mouse 182 converted data streams. The state of a key switch can be periodically read by the microprocessor. When a key switch event is detected the microprocessor toggles the routing of the keyboard and mouse converted data streams between the two computers. The currently selected computer is indicated to the user by lights 166 on the control panel that are under the control of the microprocessor. The microprocessor also continuously monitors the converted keyboard data and when it detects data corresponding to the keyboard hotkey sequence (control, alt and tab keys pressed down together) it removes the hotkey data from the keyboard data stream and toggles the routing of all subsequent keyboard and mouse data to the other computer.

The speakers 180 can be shared in one of two different modes depending on a parameter that is stored in memory during configuration and setup of the system In the first mode, the audio output from the computer that is being controlled by the keyboard and mouse is routed to the speakers. In the second mode the speakers are fed from the computer that is currently outputting sound with priority being given to the computer that is being controlled by the keyboard and mouse if both computers are outputting sound together. This allows sound alarm states to be monitored from both computers.

The routing of data to the printer is independent of the keyboard and mouse routing. When print data from either computer is detected it is routed to the printer if the printer is currently free. Any subsequent print data from the other computer is buffered in memory until a break in transmission of the original print data stream equal to the timeout period has been detected. The, buffered data is then sent to the printer. The timeout period is selectable by the user and is controlled by option switches 165 coupled to a control circuit 164. The overall effect is to allow the printer to be automatically shared between the computers. These switches are also used to instruct the microprocessor to optionally insert a form feed character at the end of each print job. This ensures that each new print job starts at the top of a fresh page.

It will be appreciated that the invention is not limited to only two USB host computers and only to the use of keyboard, mouse, printer and speaker peripherals. The device can be used to control the data routing between any number of USB host computers and USB peripheral devices and hence a wide variety of data routing systems are considered to fall within the ambit of the present invention.

What is claimed is:

1. A serial data routing device for use in routing serial data between a computer and a peripheral device, the data routing device including:
    a computer data converter which communicates data under the USB protocol with a computer and which converts data received from the computer into converted computer data;
    a peripheral data converter which communicates data under the USB protocol with the peripheral device and which converts data received from the peripheral device into converted peripheral data; and
    a data router in communication with the computer data converter and the peripheral data converter which transfers converted computer data and converted peripheral data therebetween, said data router including:
        an emulator which generates data causing USB protocol signals to be output from the computer data converter to the computer, emulating the presence of a USB peripheral device connected to the computer, and from the peripheral data converter to the peripheral device, emulating the presence of a USB host connected to the peripheral device; and
        a data routing controller which controls the routing of the converted computer data and the converted peripheral data between the computer data converter and the peripheral data converter,
    such that the computer and peripheral device operate as though directly connected by a USB bus.

2. A device as claimed in claim 1, in which the computer data converter includes processing means to convert converted peripheral data into USB protocol signals which are communicated to the computer.

3. A device as claimed in claim 1, in which the peripheral data converter includes processing means to convert converted computer data into USB protocol signals which are communicated to the peripheral device.

4. A device as claimed in claim 1, in which the device has a USB connection transferring signals between the computer and the computer data converter and the USB protocol signals are output from the computer data converter to the computer via the USB connection and mimic the connection of a peripheral operating under the USB protocol directly to the computer via the USB connection.

5. A device as claimed in claim 4, in which the device has a USB connection transferring signals between the peripheral device and the peripheral data converter and the USB protocol signals are output from the peripheral data converter to the peripheral device via the USB connection and mimic the connection of a computer operating under the USB protocol directly to the peripheral via the USB connection.

6. A device as claimed in claim 1, in which the device has a USB connection transferring signals between the peripheral device and the peripheral data converter and the USB protocol signals are output from the peripheral data converter to the peripheral device via the USB connection and mimic the connection of a computer operating under the USB protocol directly to the peripheral via the USB connection.

7. A device as claimed in claim 1, in which the data routing controller includes a microprocessor having a memory device.

8. A device as claimed in claim 7, in which routing of the converted computer data and converted peripheral data is effected by transferring data between locations within the memory device.

9. A device as claimed in claim 7, in which the data router includes a non-USB bus in communication with the computer data converter, peripheral data converter and the microprocessor and the microprocessor processes converted computer data and converted peripheral data received via the non-USB bus and controls the routing of converted computer data and converted peripheral data in response to the processing of the converted computer or peripheral data or data stored in the memory device.

10. A device as claimed in claim 9 and including a control panel having option switches in communication with the data routing controller which set the values of parameters used by the data routing controller to control the routing of the converted computer and peripheral data.

11. A device as claimed in claim 10, in which the control panel includes a visual display which gives an indication of the status of the system.

12. A serial data routing system including a plurality of computers each having a USB connection, a peripheral device having a USB connection and a serial data routing device as claimed in any preceding claim, in which the serial data routing device includes a plurality of computer data converters in communication with the data router, and each connected to a respective one of the plurality of computers by the respective USB connection and the peripheral device connected to the peripheral data converter by its USB connection.

13. A system as claimed in claim 12 and including a plurality of peripheral devices connected to the data routing device by the USB connection.

14. A system as claimed in claim 12 and including a plurality of peripheral devices and the serial data routing device having a plurality of peripheral data converters, each in communication with the data router, and each connected to one of the plurality of peripheral devices by a respective USB connection.

15. A system as claimed in claim 13, in which a plurality of the plurality of peripheral devices are connected to the data routing device by a single USB connection.

16. A system as claimed in claim 14, in which a plurality of the plurality of peripheral devices are connected to the data routing device by a single USB connection.

* * * * *